US011247613B2

(12) United States Patent
Rothschild et al.

(10) Patent No.: US 11,247,613 B2
(45) Date of Patent: Feb. 15, 2022

(54) VEHICLE DOOR MIRROR ASSEMBLY

(71) Applicants: Honda Motor Co., Ltd., Tokyo (JP); Magna Mirrors of America, Inc., Kentwood, MI (US)

(72) Inventors: Jacob A. Rothschild, Marysville, OH (US); Oscar A. Caraan, Delaware, OH (US); Matthew Scott Van Oeveren, Hudsonville, MI (US)

(73) Assignees: HONDA MOTOR CO., LTD., Tokyo (JP); MAGNA MIRRORS OF AMERICA, INC.

( * ) Notice: Subject to any disclaimer, the term of this patent is extended or adjusted under 35 U.S.C. 154(b) by 9 days.

(21) Appl. No.: 16/667,343

(22) Filed: Oct. 29, 2019

(65) Prior Publication Data
US 2021/0024002 A1    Jan. 28, 2021

Related U.S. Application Data

(60) Provisional application No. 62/876,869, filed on Jul. 22, 2019.

(51) Int. Cl.
*B60R 1/074* (2006.01)
*B60R 1/076* (2006.01)

(52) U.S. Cl.
CPC .............. *B60R 1/074* (2013.01); *B60R 1/076* (2013.01)

(58) Field of Classification Search
CPC ........... B60R 1/074; B60R 1/076; B60R 1/08; B60R 1/062; B60R 1/0602; B60R 1/06; B60R 1/1207; B60R 1/025; B60R 1/2665; B60R 1/07; B60R 2001/1215; B60R 2001/1223; G08B 21/00

USPC ............ 248/548, 549, 466, 475.1, 476, 479; 359/554, 555, 841, 838, 871, 877
See application file for complete search history.

(56) References Cited

U.S. PATENT DOCUMENTS

| 4,464,017 A | 8/1984 | Wada |
| 4,606,619 A | 8/1986 | Yamana |
| 4,832,477 A * | 5/1989 | Torii ....................... B60R 1/074 248/478 |
| 4,889,308 A | 12/1989 | Gillet |
| 4,957,359 A | 9/1990 | Kruse et al. |
| 5,190,499 A * | 3/1993 | Mori ....................... B60R 1/074 359/841 |

(Continued)

FOREIGN PATENT DOCUMENTS

| CN | 204109903 | 1/2015 |
| JP | H09150671 | 6/1997 |

(Continued)

*Primary Examiner* — Christopher Garft
*Assistant Examiner* — Michael McDuffie
(74) *Attorney, Agent, or Firm* — Rankin, Hill & Clark LLP

(57) ABSTRACT

An external mirror assembly for a vehicle includes a support arm adapted to be affixed to an associated vehicle side door and a housing movably mounted to the support arm. A glass assembly is attached to the housing. A bracket is supported within the housing for mounting an actuator, and the actuator is configured to selectively adjust the housing and glass assembly together and in tandem relative to the bracket to adjust a field of view of the glass assembly as viewed by an associated vehicle operator. A pin disposed between the housing and the bracket is configured to transfer an impact or load exerted on the housing into the bracket.

19 Claims, 7 Drawing Sheets

(56) References Cited

U.S. PATENT DOCUMENTS

| | | | |
|---|---|---|---|
| 5,227,924 A * | 7/1993 | Kerper | B60R 1/078 248/479 |
| 5,818,650 A * | 10/1998 | Nyhof | B60R 1/06 359/876 |
| 6,050,537 A | 4/2000 | Fimeri | |
| 6,239,928 B1 * | 5/2001 | Whitehead | B60R 1/078 359/871 |
| 6,276,808 B1 * | 8/2001 | Foote | B60R 1/078 248/472 |
| 6,899,438 B2 * | 5/2005 | Su | B60R 1/04 359/844 |
| 6,972,885 B2 * | 12/2005 | Hiley | G02B 7/182 248/479 |
| 8,915,601 B2 | 12/2014 | Foote et al. | |
| 9,067,541 B2 * | 6/2015 | Sobecki | B60R 1/072 |
| 9,346,403 B2 | 5/2016 | Uken et al. | |
| 9,586,526 B2 | 3/2017 | Pastrick et al. | |
| 9,827,913 B2 | 11/2017 | De Wind et al. | |
| 9,969,334 B2 | 5/2018 | De Wind et al. | |
| 10,099,618 B2 | 10/2018 | Foote et al. | |
| 10,261,648 B2 | 4/2019 | Uken et al. | |
| 2002/0048100 A1 * | 4/2002 | Hoek | B60R 1/076 248/476 |
| 2002/0085296 A1 * | 7/2002 | Hattori | B60R 1/06 359/872 |
| 2009/0190243 A1 * | 7/2009 | Fukai | B60R 1/072 359/877 |
| 2014/0376119 A1 * | 12/2014 | Sobecki | B60R 1/12 359/841 |
| 2016/0368419 A1 * | 12/2016 | Toth | B60R 1/078 |
| 2018/0257571 A1 | 9/2018 | De Wind et al. | |
| 2019/0039522 A1 | 2/2019 | Foote et al. | |
| 2019/0243492 A1 | 8/2019 | Uken et al. | |

FOREIGN PATENT DOCUMENTS

| | | |
|---|---|---|
| KR | 100680530 | 2/2007 |
| WO | 2013126719 | 8/2013 |
| WO | 2019040711 | 2/2019 |

* cited by examiner

VEHICLE DOOR MIRROR ASSEMBLY

The present application claims priority to U.S. Prov. Patent App. Ser. No. 62/876,869, filed on Jul. 22, 2019, the disclosure of which is incorporated herein by reference.

BACKGROUND

A known mirror assembly for a vehicle side door generally includes a glass assembly mounted to a housing of the mirror assembly. The glass assembly includes a mirror backing plate that is snapped onto an adapter plate housed in the housing. The adapter plate is connected to an actuator which allows the user to adjust the position of the mirror via rotating the adapter plate. The glass assembly is typically recessed into the housing to protect the glass assembly from impacts or from becoming disconnected from the adapter plate. For a frameless type mirror assembly, the glass assembly is extended out to be flush with a peripheral edge of the housing to give a frameless/seamless appearance. Because the glass assembly is no longer protected by being recessed in the housing, it is important to protect the glass assembly from easily detaching from the housing in the case of impact. More specifically, the known frameless type mirror assembly construction is vulnerable to a forward impact or load from a fore to aft direction, which can transfer force through the housing and glass assembly into the actuator. In this event, because the actuator, the glass assembly, and the attachment method used between the glass assembly and actuator are not designed to withstand excessively large or repetitive forces, loads and impacts on the housing risk damage to the actuator, detachment of the glass assembly from the actuator, and glass delamination.

BRIEF DESCRIPTION

According to one aspect, an external mirror assembly for a vehicle includes a support arm adapted to be affixed to an associated vehicle side door and a housing movably mounted to the support arm. A glass assembly is attached to the housing. A bracket is supported within the housing for mounting an actuator, and the actuator is configured to selectively adjust the housing and glass assembly together and in tandem relative to the bracket to adjust a field of view of the glass assembly as viewed by an associated vehicle operator. A pin disposed between the housing and the bracket is configured to transfer an impact or load exerted on the housing into the bracket.

According to another aspect, an external mirror assembly for a vehicle includes a support arm, a housing, a pivoting structure, a bracket, an actuator, and a pin. The support arm is adapted to be affixed to an associated vehicle side door. The housing is movably mounted to the support arm. The pivoting structure pivotally mounts the housing to the support arm, and defines a folding axis of the housing with respect to the support arm. The bracket is supported within the housing and is connected to the pivoting structure. The bracket has a curved surface with a center of curvature. The actuator is fixed to the bracket and has a pivot center aligned with the center of curvature of the curved surface. The pin is disposed between the housing and the bracket and configured to transfer an impact or load exerted on the housing into the bracket by directly contacting the curved surface of the bracket. The bracket is configured to direct the impact or load through the pivoting structure causing the housing to pivot about the folding axis.

According to another aspect, a method of directing an impact or load through an external mirror assembly is provided. The mirror assembly includes a housing, a bracket, and a pin extending from the housing and disposed between the housing and the bracket. The method includes adjusting the housing to one of a plurality of positions relative to the bracket while maintaining a longitudinal axis direction of the pin directed to a center of curvature of a curved surface of the bracket. The method also comprises, in response to an impact or load exerted on the housing, directing the pin to contact the curved surface of the bracket so as to direct the impact or load into the bracket.

DETAILED DESCRIPTION

Figure 1:
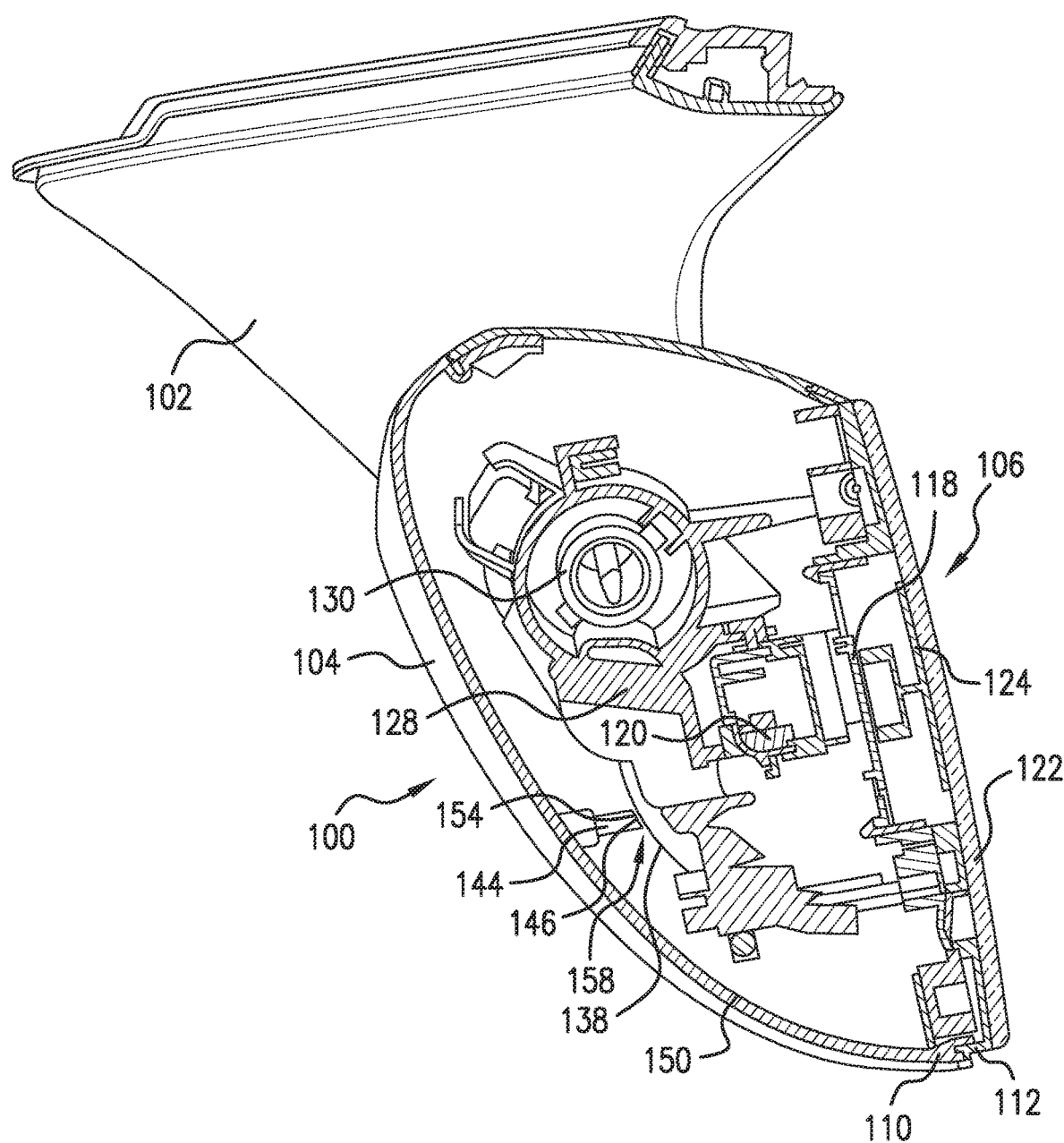
FIG. 1 is a cross-sectional view of an exemplary external mirror assembly for a vehicle according to the present disclosure.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-5 illustrate an exemplary external mirror assembly 100 for an associated vehicle according to the present disclosure. The mirror assembly 100 is attached to a support arm 102 adapted to be affixed to an associated vehicle side door, specifically to a forward side of a front door. The mirror assembly 100 generally includes a housing 104 movably mounted to the support arm 102 and a glass assembly 106 attached to the housing 104. The depicted mirror assembly 100 is configured to have a frameless appearance. Specifically, a housing peripheral edge 110 of the housing 104 and a mirror peripheral edge 112 of the glass assembly 106 are sized and aligned to be flush with each other. Thus, when looking normal to the glass assembly 106, the housing 104 does not extend around any edge of the glass assembly 106, but instead is disposed behind the glass assembly 106.

Figure 2:
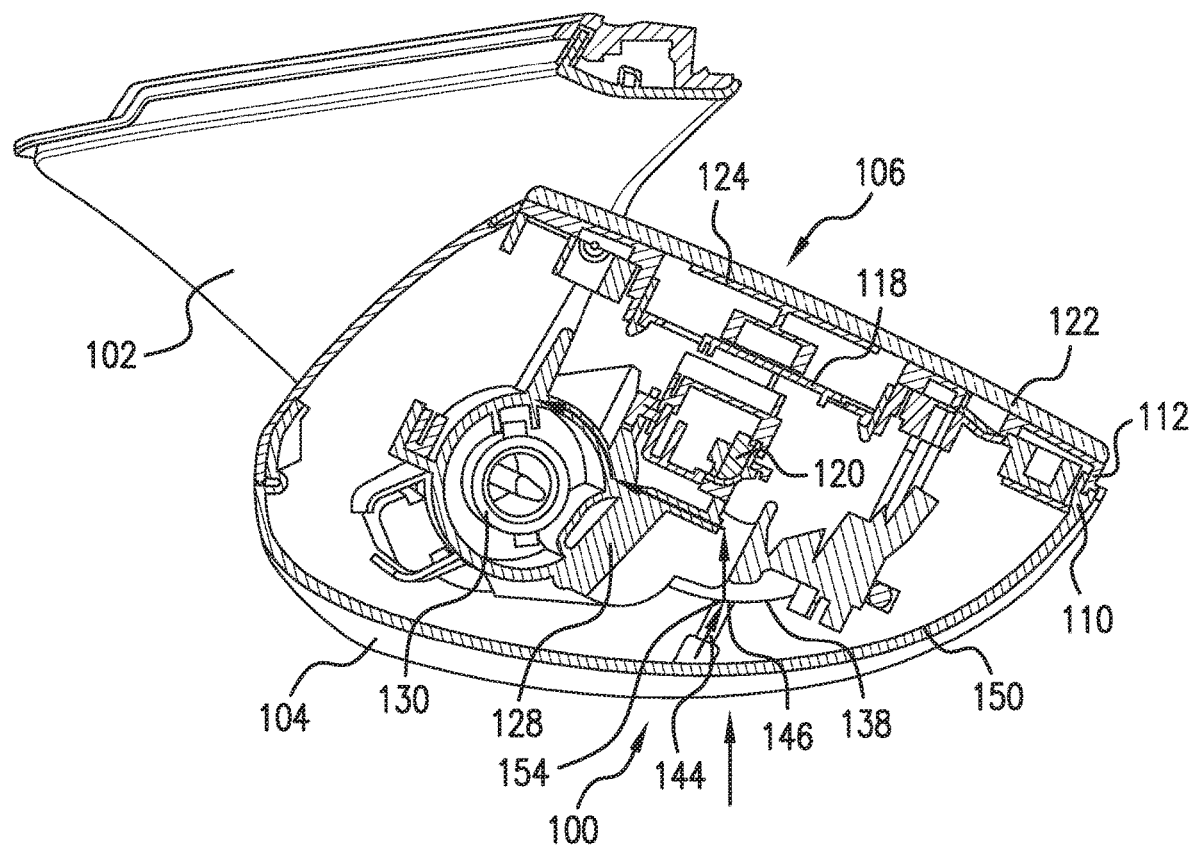
FIG. 2 is a cross-sectional view of the external mirror assembly with an impact or load exerted on a housing.

As shown in FIGS. 1 and 2, an adapter plate 118 for an actuator 120 is attached to and disposed within the housing 104 for attachment of the glass assembly 106, thereby serving to secure the glass assembly 106 to the housing 104. According to one aspect, the glass assembly 106 includes a mirror 122 defined by a reflective glass plate; however, other materials having reflective surfaces may also be implemented as the mirror 122. Furthermore, the mirror 122 may be flat or may alternatively have a contoured surface so as to be convex or concave. The mirror 122 is affixed to a mirror backing plate 124 which, in turn, is affixed to the adapter plate 118 which secures the glass assembly 106 to the housing 104. In order to form a frameless look, the mirror backing plate 124 is extended to become a visible surface of the mirror assembly 100.

Figure 4:
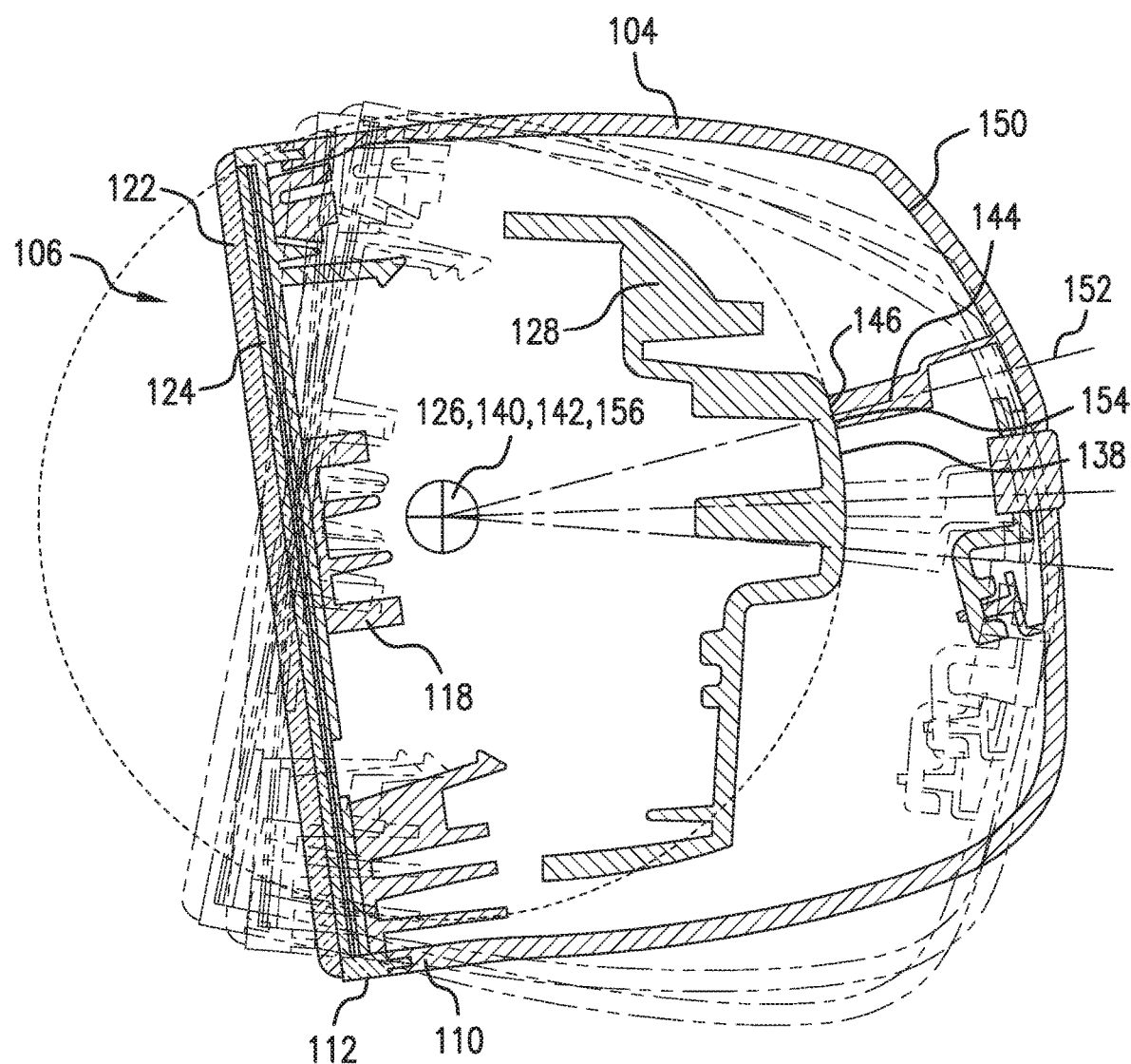
FIG. 4 is a cross-sectional view of the housing adjusted to various positions relative to a bracket.

It should be appreciated that movement of the housing 104 and glass assembly 106 together and in tandem relative to the support arm 102 (via the actuator 120) adjusts a rearward field of view of the mirror 122 as viewed by an associated vehicle operator (i.e., the driver of the vehicle). The actuator 120 can include any known mechanical arrangement to facilitate both vertical (i.e., up and down) and horizontal (i.e., side-to-side) adjustment of the housing 104 and glass assembly 106 relative to the support arm 102. Further, the actuator 120 can be directly or indirectly actuated mechanically or electrically via, for example, interior switches within the vehicle interior. As shown in FIG. 4, when actuated, the actuator 120 rotates the housing 104 about a pivot center 126.

As is known, the adapter plate 118 can be a full width adapter plate with a profile that substantially matches profiles of the housing 104 and the glass assembly 106 and allows for the attachment of the housing 104 and for the glass assembly 106. By way of example, as shown in FIGS. 1 and 2, the adapter plate 118 can include adapter clips to hold the adapter plate 118 against the actuator 120, which is attached to the housing 104, and against the mirror backing plate 124. The actuator 120 is mounted or attached within the housing 104 by a bracket 128 supported within the housing 104. The bracket 128 is connected to a pivoting structure 130 that pivotally mounts the housing 104 to a support arm portion or base portion 132 of the support arm 102. The pivoting structure 130 defines a folding axis of the housing 104 with respect to the support arm 102. The actuator 120 is configured to selectively adjust the housing 104 and glass assembly 106 together and in tandem relative to the bracket 128 to adjust a field of view of the glass assembly 106 as viewed by the associated vehicle operator. In this manner, as shown in FIG. 4, the housing 104 is configured to adopt a plurality of positions and orientations adjusted vertically or horizontally, or both vertically and horizontally relative to the bracket 128 so as to provide a similarly adjustable field of view in the glass assembly 106 as viewed by the associated vehicle operator.

According to the present disclosure, the bracket 128 includes a bracket contact surface 138 that is a curved surface having a center of curvature aligned with the pivot center 126 of the actuator 120. In the embodiment shown in FIGS. 1, 2, and 5, the bracket contact surface 138 is spherical. As shown in FIG. 4, the spherical bracket contact surface 138 has a bracket contact surface origin 140 at the center of the bracket contact surface 138. Because the spherical bracket contact surface 138 is concentric about the pivot center 126 of the actuator 120, the bracket contact surface origin 140 is collocated with the pivot center 126 of the actuator 120 such that the bracket contact surface origin 140 and the pivot center 126 are coincident with each other.

Alternatively, the bracket contact surface 138 may be cylindrical and have a bracket contact surface axis 142 directed towards the pivot center 126 of the actuator 120. It will be appreciated that from the cross-sectional view taken in FIG. 4, a cylindrical bracket contact surface is graphically identical to the spherical bracket contact surface 138. As shown in FIG. 4, the bracket contact surface axis 142 extends normal to the cross-sectional plane of FIG. 4. Because the cylindrical bracket contact surface 138 is coaxial with the pivot center 126 of the actuator 120, the bracket contact surface axis 142 is directed through the pivot center 126 of the actuator 120 such that the bracket contact surface axis 142 intersects the pivot center 126 of the actuator 120.

Figure 3A:
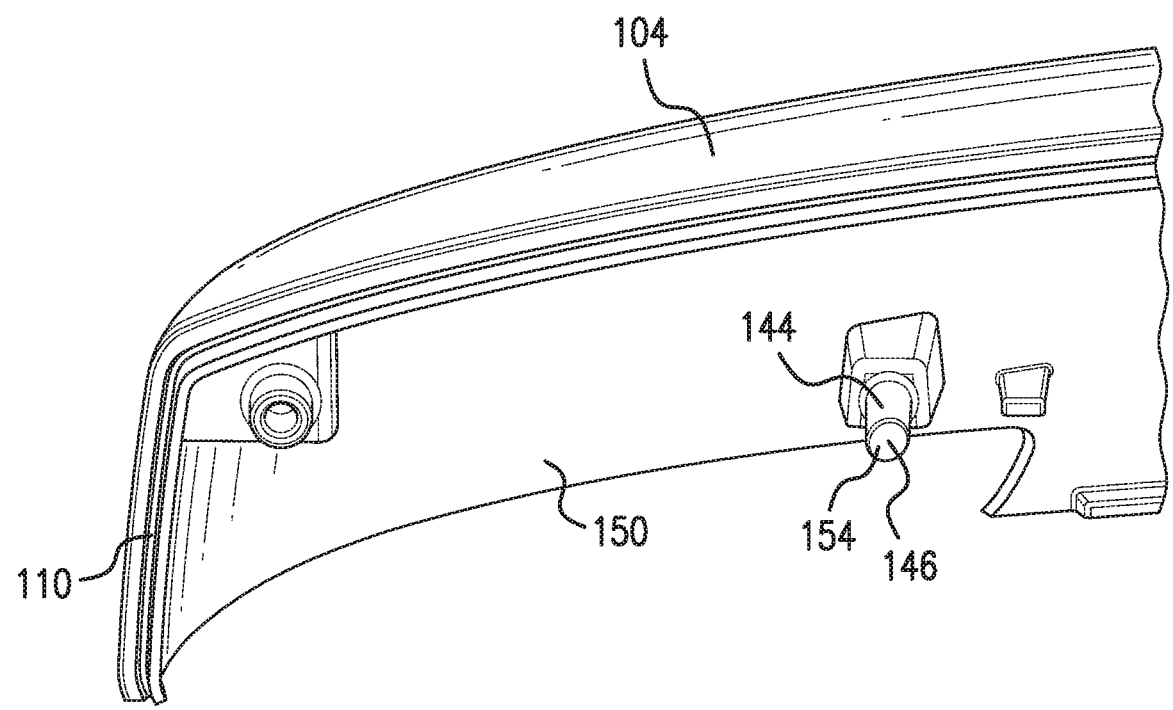
FIG. 3A is a partial perspective view of the housing.
Figure 3B:
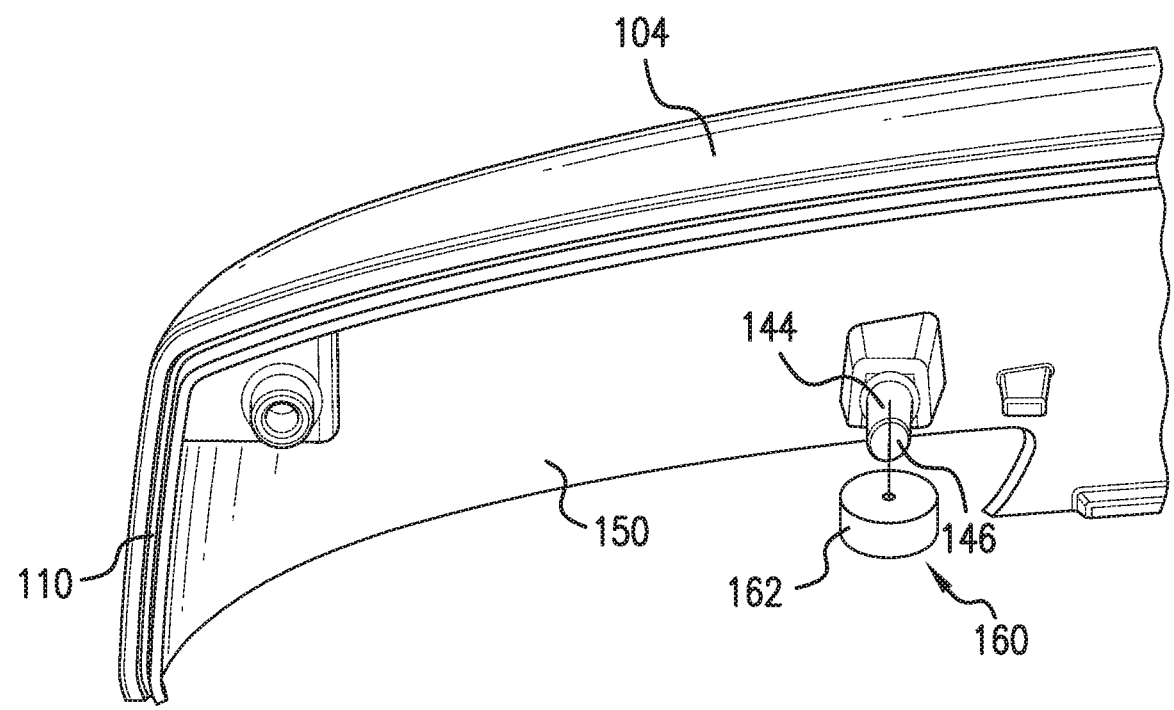
FIG. 3B is a partial perspective view of the housing according to another aspect of the present disclosure.

As shown in FIGS. 1, 2, and 3A, the housing 104 includes a pin 144 disposed between the housing 104 and the bracket 128. The pin 144 extends from an inner surface 150 of the housing 104 towards the bracket contact surface 138. Further, in the depicted aspect, the pin 144 is integrally formed from a portion of the housing 104 located in front of the bracket 128 relative to the associated vehicle, and in this manner the pin 144 is configured to transfer a front impact or load directed from a fore to aft position into the housing 104. It should be appreciated that alternative to being integrally formed from the housing 104, the pin 144 may be otherwise fixed within the housing 104, and that the pin 144 may be located elsewhere within the housing 104 relative to the bracket 128 so as to transfer an impact or load from the housing 104 into the bracket 128 from a direction other than the fore to aft direction of the housing 104.

Figure 5:
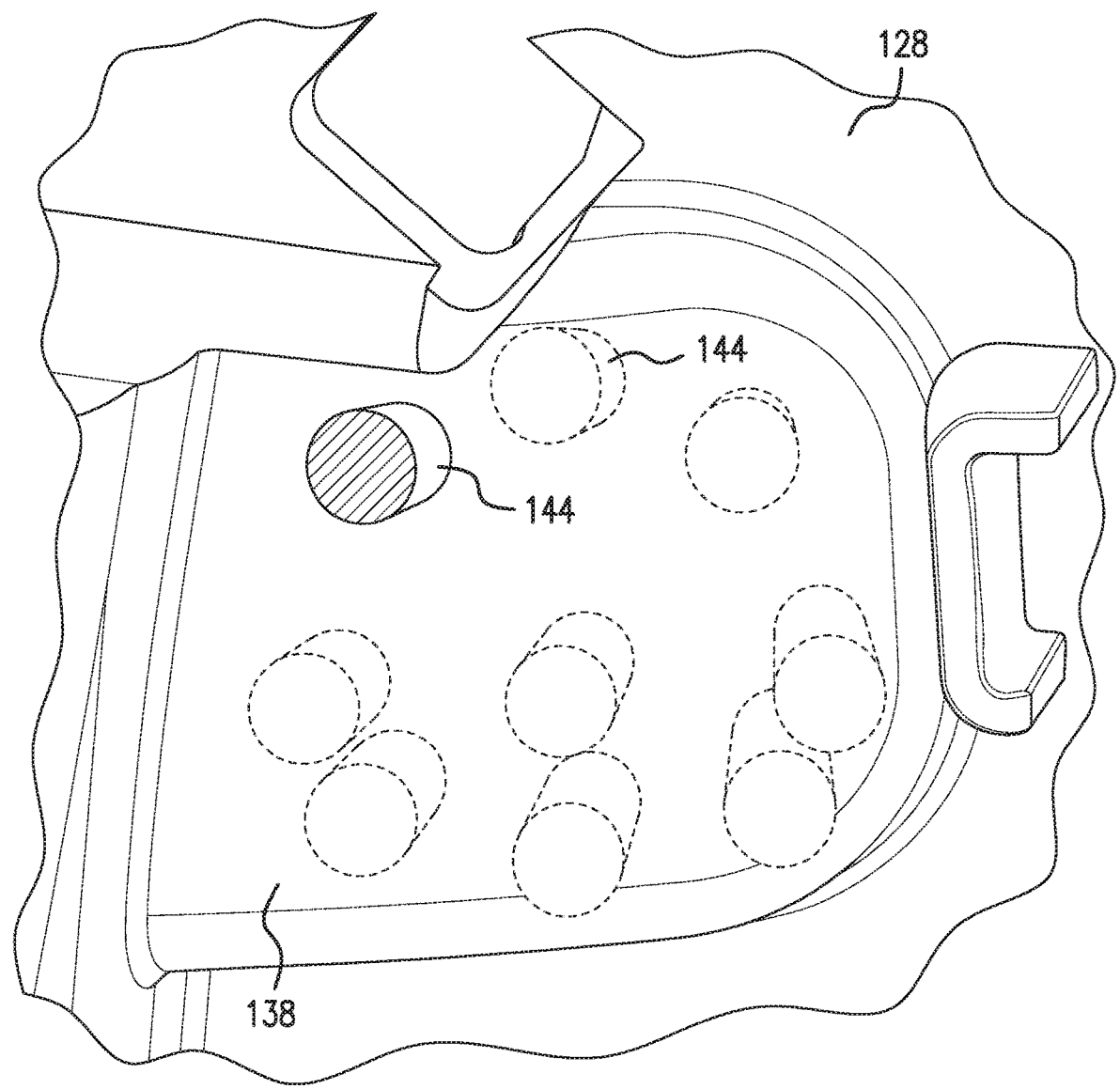
FIG. 5 is a partial perspective view of the housing adjusted to various positions relative to a bracket.

With reference to FIG. 4, in an actuator adjusted position of the housing 104 relative to the bracket 128 a longitudinal axis 152 defined by the pin 144 is directed to the pivot center 126 of the actuator 120. As a result, because the bracket contact surface 138 is a curved surface with a center of curvature aligned with or at the pivot center 126 of the actuator 120, the pin longitudinal axis 152 is perpendicular to the bracket contact surface 138 when the housing 104 is in an actuator adjusted position relative to the bracket 128 (see FIG. 4). As shown in FIG. 5, the bracket contact surface 138 is sufficiently sized to receive contact with the pin 144 from an actuator adjusted position of the housing 104 relative to the bracket 128. More specifically, FIG. 5 depicts the pin 144 in a current position in solid lines, and FIG. 5 further depicts the pin 144 in alternative actuator adjusted positions relative to the bracket 128 in hidden lines, exemplifying the boundaries of adjustment of the housing 104 relative to the bracket 128. In each depicted alternative position of the pin 144, a distal end 146 of the pin 144 remains directed towards the bracket contact surface 138 for contacting the bracket contact surface 138 when the housing 104 is sufficiently deformed. Notably, because the bracket contact surface 138 is designed to be concentric about the pivot center 126 of the actuator 120, the bracket contact surface 138 remains perpendicular with the pin longitudinal axis 152 when the housing 104 and the pin 144 rotate in tandem vertically or horizontally, or both vertically and horizontally about the pivot center 126 of the actuator 120 relative to the bracket 128.

According to one aspect, the distal end 146 of the pin 144 is configured to mate with the bracket contact surface 138. As shown in FIG. 4, with a spherical bracket contact surface 138 an embodiment of the pin 144 includes a spherical pin contact surface 154 defining a face of the distal end 146 that faces the bracket contact surface 138. The spherical pin contact surface 154 has a pin contact surface origin 156 that is coincident with the pivot center 126 of the actuator 120 and bracket contact surface origin 140 when the pin contact surface 154 contacts the spherical bracket contact surface 138. Further, with a cylindrical bracket contact surface 138 an embodiment of the pin 144 includes a cylindrical pin contact surface 154 defining a face of the distal end 146 that faces the bracket contact surface 138. The cylindrical pin contact surface 154 has a pin contact surface axis 156 that is coincident with the pivot center 126 of the actuator 120 and bracket contact surface axis 142 when the pin contact surface 154 contacts the cylindrical bracket contact surface 138.

As shown in FIG. 1, when no impact or load is exerted on the housing 104, the pin 144 and the bracket 128 define a gap 158 therebetween, including when the housing 104 is in an actuator adjusted position relative to the bracket 128. As shown in FIG. 2, when an impact or load is exerted on the housing 104 (the impact or load depicted by the arrow directed toward the housing 104 in FIG. 2), the housing 104 is adapted to at least partially deform until the pin 144 directly contacts the bracket 128, which transfers the impact or load from the housing 104 to the bracket 128. The pin 144 may transfer either a static load or an impact load that is sufficient to deform the housing 104 such that the pin 144 directly contacts the bracket contact surface 138.

When the impact or load is removed from the housing 104, the housing 104 is adapted to return to its original, undeformed position (FIG. 1) and the pin 144 disengages from the bracket contact surface 138 such that the gap 158 is redefined between the pin 144 and the bracket 128. It will be appreciated that the pin 144 may alternatively extend from the bracket 128 towards the housing 104 to define a gap between the housing 104 and the pin 144 when no impact or load is exerted on the housing 104. In this embodiment, the inner surface 150 of the housing 104 contacts the pin 144 when an impact or load is exerted on the housing 104.

With the described external mirror assembly 100, as shown in FIG. 2, a load path between the housing 104 and the actuator 120 is defined through the pin 144 and the bracket 128 when the housing 104 incurs an impact or load sufficient to deform the housing 104 until the gap 158 between the pin 144 and the bracket 128 is closed (the load path depicted by the arrows through the pin 144 and bracket 128 in FIG. 2). As shown between FIGS. 1 and 2, when an impact or load is transferred from the pin 144 to the bracket 128, the bracket 128 directs the impact or load through the pivoting structure 130. The impact or load is further directed around the folding axis defined by the pivoting structure 130, causing the housing 104 to rotate or pivot about the folding axis in the direction of the load. Accordingly, the impact or load is not transferred to the actuator 120, which prevents rotation of the housing 104 and glass assembly 106 about the pivot center 126 of the actuator 120.

As shown in FIG. 2, the pin 144 directly contacts the bracket 128 when the impact or load is exerted on the housing 104. When no impact or load is exerted on the housing 104, the gap 158 between the pin 144 and the bracket 128 is as small as part tolerances will allow, which minimizes the extent to which the housing 104 deforms before the pin 144 contacts the bracket 128. It will be appreciated that normal operation of the associated vehicle can shake the external mirror assembly 100 or otherwise place regular minute forces on the housing 104 relative to the bracket 128 such that if the housing 104 and bracket 128 did not maintain the gap 158 between the pin 144 and the bracket contact surface 138 during normal operation, the housing 104 or bracket 128 may incur damage from unnecessary contact and friction. For at least this reason, one advantage of maintaining the gap 158 between the pin 144 and the bracket contact surface 138 is avoiding damage to the housing 104 and the bracket 128 during normal operation of the associated vehicle. As a result, maintaining the gap 158 between the pin 144 and the bracket 128 during normal operation of the associated vehicle improves the reliability and longevity of the mirror assembly 100. Also, because the housing 104 deforms only minimally until the pin 144 contacts the bracket 128, deformation of the housing 104 before contact with the bracket 128 is wholly elastic, such that the housing 104 may repeatedly deform and return to an undeformed position in response to an impact or load and transfer the impact or load to the bracket 128 without incurring any plastic deformation or permanent damage.

According to one embodiment, the pin 144 includes a standoff 160 with a rolling ball 162 disposed on the pin end 146. The standoff 160 extends from the pin end 146 toward the bracket contact surface 138 in an actuator adjusted position of the housing 104 relative to the bracket 128. The rolling ball 162 is configured to roll against the bracket contact surface 138 when the pin 144 is in contact with the bracket contact surface 138, in response to tangential forces between the bracket 128 and the pin 144. Examples of tangential forces between the pin 144 and the bracket contact surface 138 include force from the actuator 120 adjusting the housing 104 relative to the bracket 128, or random vibration of the mirror assembly 100 during use of the associated vehicle. With the described rolling ball 162 construction, the pin end 146 may remain in contact with the bracket contact surface 138 while mitigating unnecessary friction between the pin 144 and the bracket 128. As a result, the rolling ball 162 prevents damage between the housing 104 and bracket 128 caused by unnecessary friction therebetween.

Figure 3C:
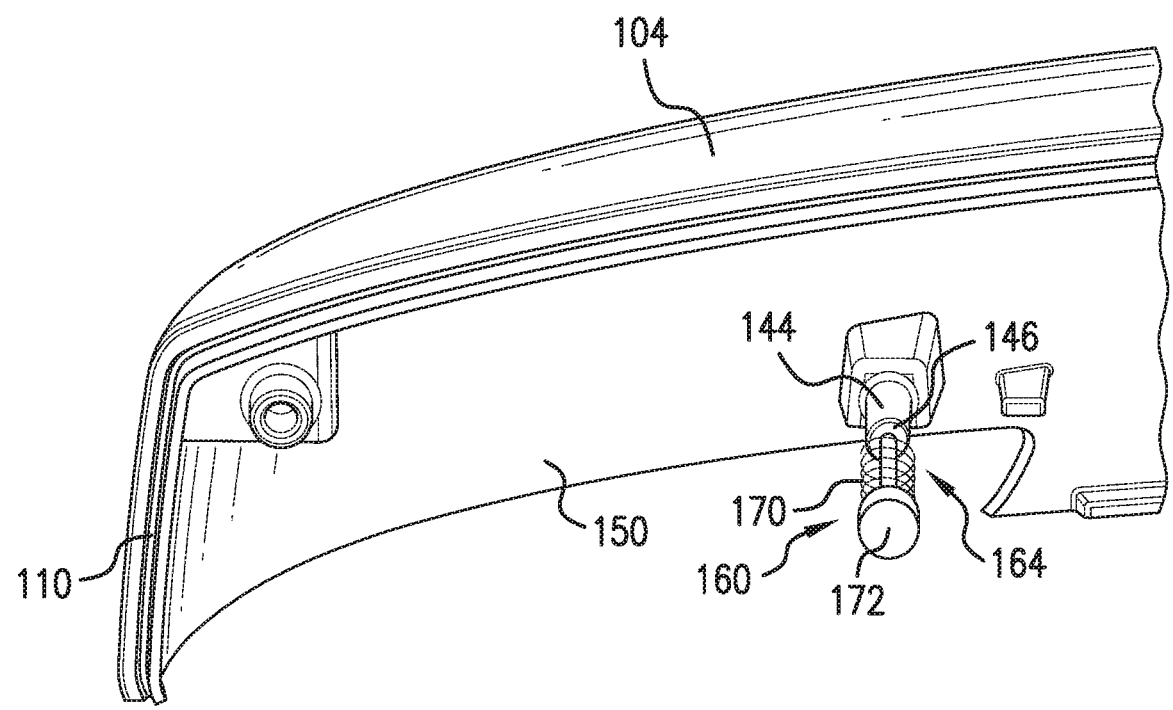
FIG. 3C is a partial perspective view of the housing according to another aspect of the present disclosure.

In another embodiment, as shown in FIG. 3C, the pin 144 includes the standoff 160 with a spring assembly 164 disposed on the pin end 146 directed towards the bracket contact surface 138. As depicted, the spring assembly 164 is disposed between the pin 144 and the bracket contact surface 138, and includes a spring 170 and a bracket contact portion 172. When no impact or load is exerted on the housing 104 toward the bracket 128, the spring assembly 164 is unrestrained on a side directed towards the bracket 128, and the spring assembly 164 rests in an extended position. When the housing 104 first deforms toward the bracket 128 in response to an impact or load, the spring assembly 164 makes initial contact with the bracket contact surface 138 in the extended position. As the housing 104 continues to deform towards the bracket 128, the spring 170 is compressed such that the spring assembly 164 exerts a spring force onto the bracket 128 proportional to the deformation of the spring 170. With the described spring assembly 164 construction, an impact between the pin 144 and the bracket 128 is softened by the spring assembly 164. As a result, the spring assembly 164 helps prevent damage between the housing 104 and the bracket 128 caused by unnecessary impacts therebetween.

As is further evident from the foregoing, a method of directing an impact or load through an external mirror assembly 100 having a housing 104, a bracket 128, a pivoting structure 130 connected to the bracket 128, and a pin 144 extending from the housing 104 and disposed between the housing 104 and the bracket 128 is provided. The exemplary method includes adjusting the housing 104 to one of a plurality of positions relative to the bracket 128 while maintaining a longitudinal axis of the pin 144 directed to a center of curvature of a bracket contact surface 138, the bracket contact surface 138 being a curved surface of the bracket 128. In response to an impact or load exerted on the housing 104, the method also includes directing the pin 144 to contact the bracket contact surface 138 so as to transfer the impact or load into the bracket 128. The method includes directing the impact or load from the bracket 128 through the pivoting structure, and around the folding axis of the pivoting structure 130 such that the mirror assembly 100 rotates about the folding axis of the pivot structure.

When no impact or load is exerted on the housing 104, the pin 144 does not contact the bracket 128 such that a gap 158 is defined between the pin 144 and the curved surface of the bracket 128, and the step of directing the pin 144 to contact the curved surface of the bracket 128 includes deforming the housing 104 so as to close the gap 158 between the pin 144 and the bracket 128. When the impact or load is removed from the housing 104, the housing 104 returns to an undeformed state such that the pin 144 does not contact the bracket 128 and the gap 158 is redefined between the pin 144 and the curved surface of the bracket 128.

The step of directing the pin 144 to contact the bracket contact surface 138 further includes contacting the bracket 128 with a rolling ball 162 or spring assembly 164 disposed on a distal end 146 of the pin. The mirror assembly 100 further directs an impact or load from the bracket 128 to a pivoting structure 130, around a pivot center 126 of the actuator 120. Consequently, the mirror assembly 100 rotates about the pivot center 126 of the actuator 120 in response to the impact or load being directed to the pivoting structure 130 and around the pivot center 126 of the actuator 120.

It will be appreciated that variations of the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An external mirror assembly for a vehicle comprising:
  a support arm adapted to be affixed to an associated vehicle side door;
  a housing movably mounted to the support arm;
  a glass assembly attached to the housing;
  a bracket supported within the housing for mounting an actuator, the actuator configured to selectively adjust the housing and glass assembly together and in tandem relative to the bracket to adjust a field of view of the glass assembly as viewed by an associated vehicle operator;
  a pin disposed between the housing and the bracket, the pin configured to transfer an impact or load exerted on the housing into the bracket,
  wherein the pin extends from an inner surface of the housing toward the bracket, the actuator adjusts the housing and glass assembly around a pivot center, the bracket includes a curved surface with a center of curvature aligned with the pivot center and configured for receiving direct contact of the pin, and the pin has a longitudinal axis configured to intersect the pivot center from an actuator adjusted position of the housing.

2. The external mirror assembly of claim 1, wherein the pin and the bracket define a gap therebetween which is maintained in an adjusted position of the housing relative to the bracket when no impact or load is exerted on the housing, and the pin directly contacts the bracket when an impact or load is exerted on the housing.

3. The external mirror assembly of claim 1, further comprising a standoff that includes a rolling ball disposed on an end of the pin directed towards the bracket.

4. The external mirror assembly of claim 1, further comprising a standoff that includes a spring assembly disposed on an end of the pin directed towards the bracket.

5. The external mirror assembly of claim 1, wherein the pin extends from the inner surface of the housing located in front of the bracket such that the pin is configured to transfer an impact or load directed from a fore to aft position of the housing into the bracket.

6. The external mirror assembly of claim 1, further comprising a pivoting structure that pivotally mounts the housing to the support arm, the pivoting structure defines a folding axis of the housing with respect to the support arm, the bracket is connected to the pivoting structure, wherein the housing is adapted to elastically deform in response to an impact or load to bring the pin in direct contact with the bracket, thereby transferring the impact or load exerted on the housing into the bracket and through the pivoting structure, the impact or load is directed around the folding axis of the pivoting structure causing the housing to pivot about the folding axis.

7. An external mirror assembly for a vehicle comprising:
  a support arm adapted to be affixed to an associated vehicle side door;
  a housing movably mounted to the support arm;
  a pivoting structure that pivotally mounts the housing to the support arm, the pivoting structure defines a folding axis of the housing with respect to the support arm;
  a bracket supported within the housing and connected to the pivoting structure, the bracket having a curved surface with a center of curvature;
  an actuator fixed to the bracket, the actuator having a pivot center aligned with or at the center of curvature of the curved surface; and
  a pin disposed between the housing and the bracket, the pin configured to transfer an impact or load exerted on the housing into the bracket by directly contacting the curved surface of the bracket, the bracket configured to direct the impact or load through the pivoting structure causing the housing to pivot about the folding axis.

8. The external mirror assembly of claim 7, wherein the curved surface of the bracket is spherical and has an origin aligned with the pivot center of the actuator.

9. The external mirror assembly of claim 8, the pin further comprising a spherical pin contact surface having an origin aligned with the pivot center of the actuator when the pin is in contact with the curved surface of the bracket.

10. The external mirror assembly of claim 7, wherein the curved surface of the bracket is cylindrical and has a longitudinal axis directed through the pivot center of the actuator.

11. The external mirror assembly of claim 7, further comprising a glass assembly including a mirror, the glass assembly being fixed to both the actuator and the housing, wherein an impact or load path between the housing and the mirror is defined through the pin and the bracket when an impact or load is exerted on the housing.

12. The external mirror assembly of claim 7, wherein the housing is configured to adopt a plurality of positions relative to the bracket, and in each position of the housing the pin and the curved surface of the bracket define a gap therebetween when the housing is not exposed to an impact or load.

13. The external mirror assembly of claim 7, wherein the pin extends from the housing toward the curved surface of the bracket and further defines a longitudinal axis directed towards the pivot center of the actuator, the pin being arranged so that rotation of the housing relative to the bracket maintains the longitudinal axis direction toward the pivot center.

14. A method of directing an impact or load through an external mirror assembly having a housing, a bracket, and a pin extending from the housing and disposed between the housing and the bracket, the method comprising:

adjusting the housing to one of a plurality of positions relative to the bracket while maintaining a longitudinal axis direction of the pin directed to a center of curvature of a curved surface of the bracket, wherein the center of curvature of the curved surface of the bracket is aligned with a pivot center about which the housing rotates, and the longitudinal axis of the pin intersects the pivot center; and in response to an impact or load exerted on the housing, directing the pin to contact the curved surface of the bracket so as to direct the impact or load into the bracket.

15. The method of claim 14, including contacting the bracket with a rolling ball disposed on an end of the pin.

16. The method of claim 14, including contacting the bracket with a spring assembly disposed on an end of the pin.

17. The method of claim 14, wherein the mirror assembly includes a pivoting structure that pivotally mounts the housing to the support arm, the pivoting structure defines a folding axis of the housing with respect to the support arm, the bracket is connected to the pivoting structure, and the method includes directing the impact or load from the bracket through the pivoting structure, and around the folding axis such that the mirror assembly rotates about the folding axis of the pivot structure.

18. The method of claim 14, wherein when no impact or load is exerted on the housing the pin does not contact the bracket such that a gap is defined between the pin and the curved surface of the bracket, and the step of directing the pin to contact the curved surface of the bracket includes deforming the housing in response to an impact of load so as to close the gap between the pin and the bracket.

19. The method of claim 18, wherein when the impact or load is removed from the housing, the method includes returning the housing to an undeformed state such that the pin does not contact the bracket and the gap is redefined between the pin and the curved surface of the bracket.

* * * * *